United States Patent [19]

Eun et al.

[11] Patent Number: 5,535,602
[45] Date of Patent: Jul. 16, 1996

[54] ABSORPTION COOLING DEVICE

[75] Inventors: Seok-Hyun Eun, Seoul; Seung-Kap Lee, Suwon, both of Rep. of Korea

[73] Assignee: Samsung Electronics Co., Ltd., Suwon, Rep. of Korea

[21] Appl. No.: 365,956

[22] Filed: Dec. 29, 1994

[30] Foreign Application Priority Data

Feb. 25, 1994 [KR] Rep. of Korea ................. 94-3517

[51] Int. Cl.⁶ .................... F25B 37/00; F25B 15/00
[52] U.S. Cl. ................................ 62/489; 62/476
[58] Field of Search .................... 62/101, 476, 484, 62/489, 495

[56] References Cited

U.S. PATENT DOCUMENTS

| | | | |
|---|---|---|---|
| 2,215,674 | 9/1940 | Ullstrand | 62/489 |
| 3,389,573 | 6/1968 | Papapanu et al. | 62/476 |
| 3,641,784 | 2/1972 | Schlichtig | 62/476 |
| 4,464,907 | 8/1984 | Mack et al. | 62/101 |
| 4,702,085 | 10/1987 | Gockel et al. | 62/101 |
| 5,127,234 | 7/1992 | Woods | 62/101 |

FOREIGN PATENT DOCUMENTS 6-241612  9/1994  Rep. of Korea.

Primary Examiner—Henry A. Bennett
Assistant Examiner—William C. Doerrler
Attorney, Agent, or Firm—Burns, Doane, Swecker & Mathis

[57] ABSTRACT

An absorption cooling system includes an evaporator which receives liquid refrigerant from a condenser and evaporates that refrigerant to produce a cooling effect. The gaseous refrigerant produced by evaporation in the evaporator is supplied to an absorber which mixes that gaseous refrigerant with concentrated liquid refrigerant received from a generator to produce a dilute refrigerant solution. The dilute refrigerant solution is delivered from the absorber to the generator and is separated into a gaseous refrigerant and a concentrated liquid refrigerant. The gaseous refrigerant from the generator is passed through a heat exchanger and transfers heat to the cooler dilute refrigerant traveling from the absorber to the generator. Some of the gaseous refrigerant is condensed in the heat exchanger and is supplied to the evaporator, while the remaining uncondensed refrigerant is supplied to the condenser.

2 Claims, 2 Drawing Sheets

ABSORPTION COOLING DEVICE

BACKGROUND OF THE INVENTION

1. Field of the Invention

The present invention relates to an absorption cooling device for generating a cooling output by utilizing lithium bromide solution, and more particularly to an absorption cooling device with improved cooling efficiency and reduced size.

2. Description of the Prior Art

Generally, an absorption cooling device for generating a cooling output by using lithium bromide solution has been disclosed.

One example of such conventional absorption cooling device is disclosed in Korean patent application No. 92-20549 filed on Nov. 3, 1992 by the present assignee.

The absorption cooling device according to the patent application No. 92-20549, as illustrated in FIG. 1, includes a generator 10' for separating a refigerant gas and a concentrated solution, a condenser 12' for condensing into refrigerant solution the refrigerant gas supplied from the generator 10' and an evaporator 14' for evaporating the refrigerant gas condensed in the condenser 12' to thereby generate a cooling output. The device further includes an absorber 15' disposed between the generator 10' and the evaporator 14' and for receiving the concentrated solution generated from the generator 10' and the refrigerant gas from the evaporator 14' in order for the refrigerant gas to be changed into a dilute solution by being absorbed into the concentrated solution while the refrigerant gas and the concentrated solution rise up; and a pump means 22' for generating a power in order to raise the refrigerant gas and the concentrated solution fed to a lower chamber 16' of the absorber 15'.

Furthermore, the conventional absorption cooling device is provided with a heat exchanger 18' between the generator 10' and the absorber 15' to thereby cause the heat generated from the dilute solution and concentrated solution to be heat-exchanged.

In the conventional absorption cooling device having the above-mentioned construction, because a larger quantity of refrigerant gas is absorbed into the concentrated solution, an absorption efficiency of the absorber 15' has been improved to thereby increase the cooling efficiency.

Furthermore, a larger amount of refrigerant gas has been separated in the generator 10' because a larger amount of refrigerant gas is absorbed in the absorber 15'.

Still furthermore, because the larger amount of refrigerant gas separated in the generator 10' should be condensed in the condenser 12', it should be apparent that the condenser 12' must be made bigger in size.

In other words, in order to condense much more refrigerant gas, the absorption cooling device has been increased in size, thereby resulting in a problem in that the overall system has also increased in size.

SUMMARY OF THE INVENTION

The present invention solves the aforementioned problem, and it is an object of the present invention to provide an absorption cooling device in which condensing efficiency can be markedly improved to thereby increase the cooling output remarkably and to enable the device to be made more compact.

Therefore, the present invention has been devised in view of the aforesaid problems encountered in the prior arts and an object of the present invention is to provide an absorption cooling device capable of minimizing the load on the condenser to thereby enable the size thereof to be reduced and at the same time, of improving the condensing efficiency to thereby obtain an increased cooling efficiency.

In accordance with the object of the present invention, there is provided an absorption cooling device, which comprises an evaporator for generating a cooling output, an absorber for generating a dilute solution and a generator for separating the dilute solution generated in the absorber into a refrigerant gas and a concentrated solution, the device further comprising: a precooling heat exchanger for heat-exchanging the refrigerant gas separated from the generator and the dilute solution created from the absorber to thereafter condense the refrigerant gas; and a condenser for condensing the refrigerant gas not condensed in the precooling heat exchanger.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

A preferred embodiment of an absorption cooling device according to the present invention will be described in detail with reference to the accompanying drawings.

Figure 1:
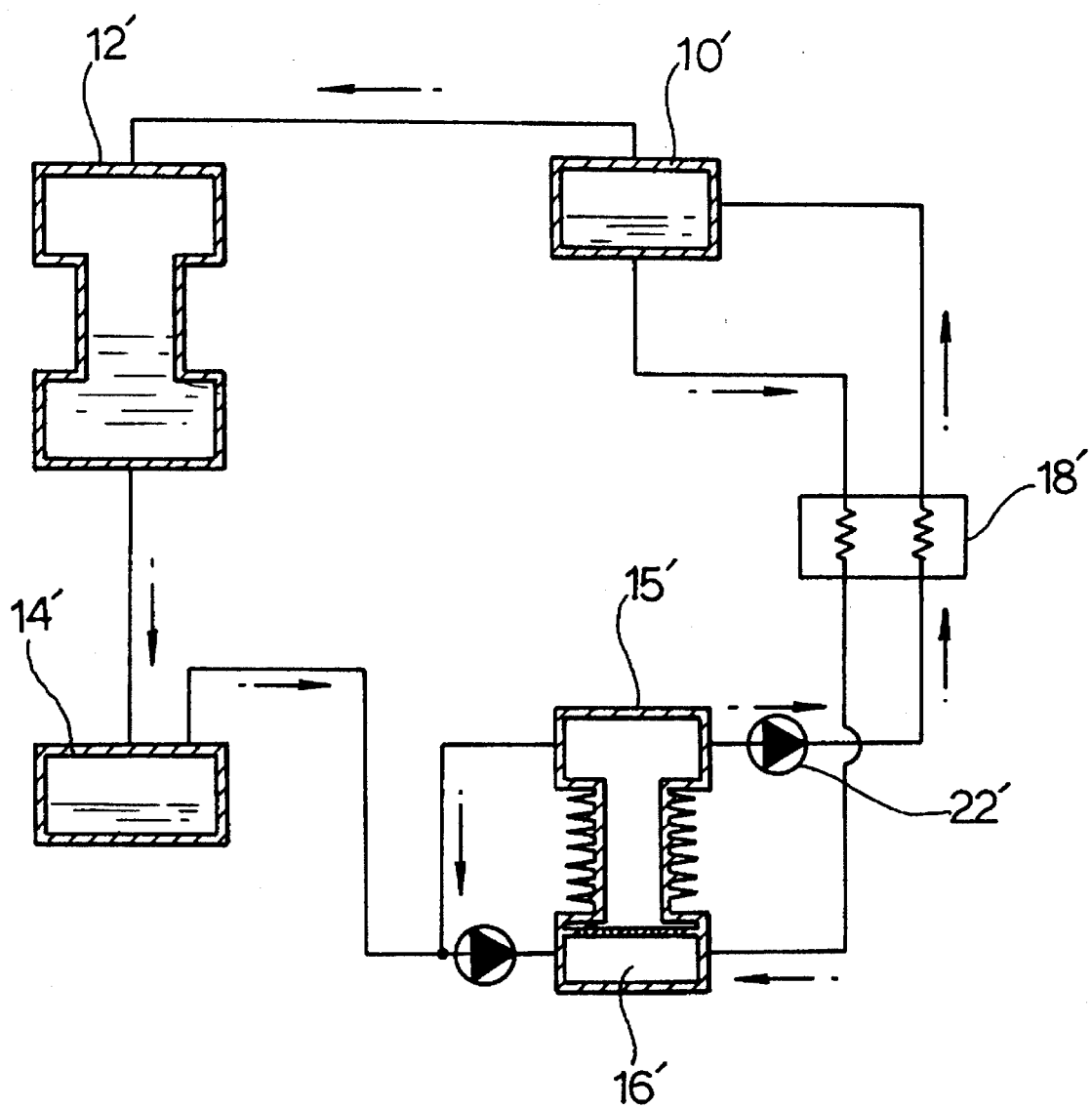
FIG. 1 is a schematic diagram illustrating a conventional system of an absorption cooling device.
Figure 2:
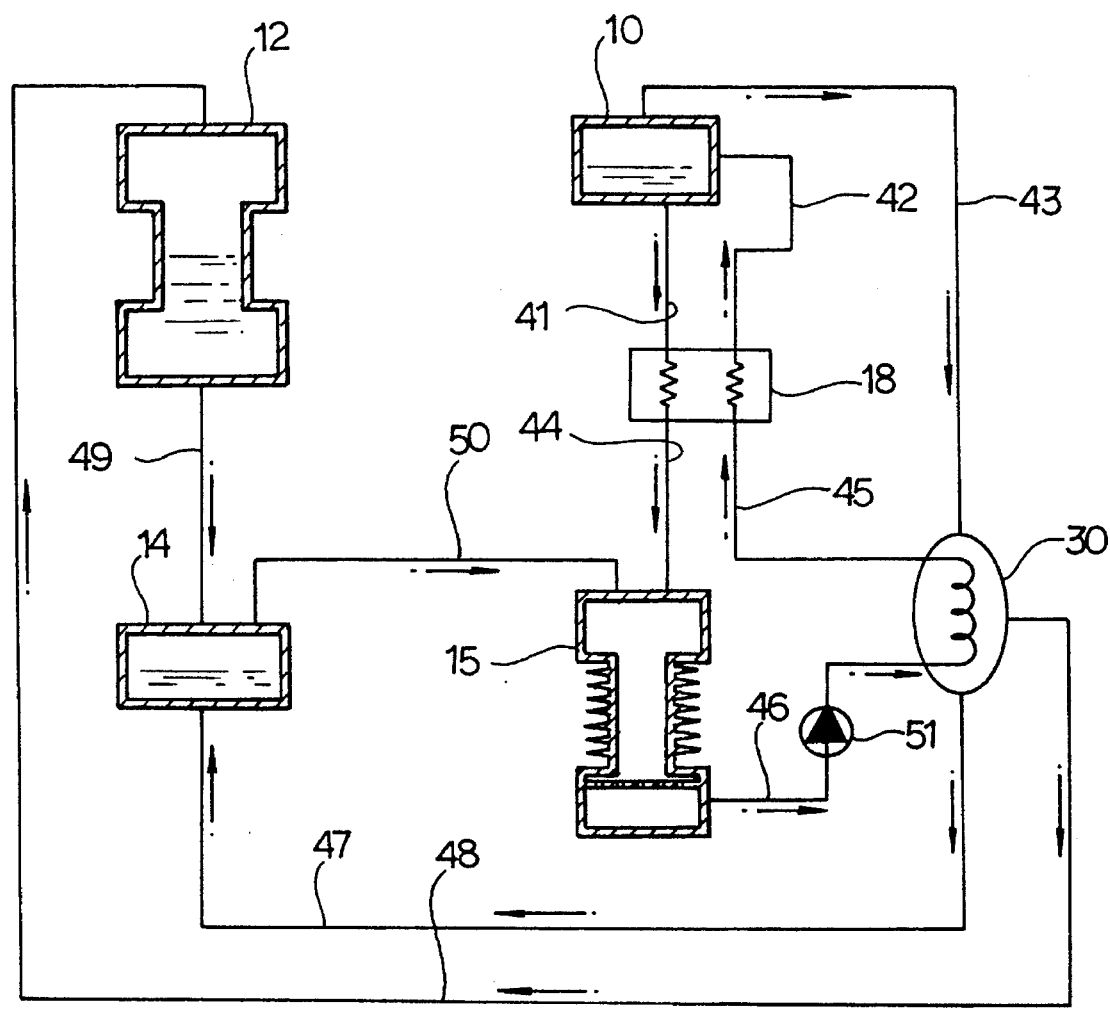
FIG. 2 is a schematic diagram illustrating an absorption cooling device according to the present invention.

FIG. 2 is a schematic diagram for illustrating an absorption cooling device according to the present invention.

In FIG. 2, reference numeral 10 denotes a generator adapted to separate a dilute solution fed from an absorber (to be described hereinafter) into a concentrated solution and a refrigerant gas by a heat generated from a burner means (not shown).

Reference numeral 12 is denotes a condenser adapted to condense the refrigerant gas separated in the generator 10 to thereby change the same into a refrigerant solution, and reference numeral 15 denotes an absorber adapted to change the refrigerant gas into the dilute solution by being absorbed into the concentrated solution supplied from the generator.

A heat exchanger 18 is disposed between the absorber 15 and the generator 10, for exchanging heat between the concentrated solution separated in the generator 10 and the dilute solution from the absorber 15.

In other words, between the generator 10 and the heat exchanger 18, there is disposed a first pipe member 41 for guiding a flow of the concentrated solution separated from the generator 10 and a second pipe member 42 for guiding a flow of the dilute solution discharged from the absorber 15.

Between the absorber 15 and the heat exchanger 18, there is disposed a fourth pipe member 44 for guiding a flow of the concentrated solution which has passed through the first piping member 41 and fifth and sixth pipe members 45 and 46 for guiding a flow of the dilute solution from the absorber 15, so that the high-temperatured concentrated solution from the generator 10 and the low-temperature dilute solution from the absorber 15 can exchange heat.

Furthermore, ends of the sixth and fifth pipe members 46 and 45 is connected to a precooling heat exchanger 30, which are in turn connected to a third pipe member 43 for receiving a flow of the refrigerant gas separated in the generator 10. An eighth pipe member 48 guides uncondensed refrigerant gas from the heat exchanger 30 to the condenser 12, and a seventh pipe member 47 guides condensed refrigerant solution from the heat exchanger 30 to an evaporator (to be described hereinafter).

In other words, part of the refrigerant gas from the generator 10 is condensed into refrigerant solution because the high-temperatured refrigerant gas separated in the generator 10 and the low-temperatured dilute solution from the absorber 15 exchanged heat in the precooling heat exchanger 30.

Furthermore, the refrigerant solution condensed in the precooling heat exchanger 30 is guided by the seventh pipe member 47 to the evaporator 14 (to be described hereinafter), and the uncondensed refrigerant gas is guided by the eighth pipe member 48 to the condenser 12.

Meanwhile, reference numeral 14 in the FIG. 2 is an evaporator for generating a cooling output as a result of the refrigerant solution condensed in the condenser 12 and the refrigerant solution condensed in the precooling heat exchanger 30 being evaporated.

Furthermore, between the evaporator and the condenser 12, there is disposed a ninth pipe member 49 for guiding the flow of the refrigerant solution so that the refrigerant solution condensed in the condenser 12 can be fed to the evaporator 14. Between the evaporator 14 and the precooling heat exchanger 30, there is disposed the seventh pipe member 47 for guiding the flow of the refrigerant solution so that the refrigerant solution condensed in the precooling heat exchanger 30 can be supplied to the evaporator 14.

Between the evaporator 14 and the absorber 15, there is disposed a tenth pipe member 50 for guiding the refrigerant gas evaporated in the evaporator 14 to the absorber 15.

Meanwhile, in FIG. 2, reference numeral 51 denotes a pump means for feeding the dilute solution changed in the absorber to the generator 10.

The operation of the absorption cooling device according to the present invention thus constructed will now be described in detail with reference to FIG. 2.

When the system is activated, the dilute solution fed by pipe 42 to the generator 10 is heated by a heat of a burner means (not shown) to thereby divide the same into the refrigerant gas and concentrated solution.

Furthermore, the concentrated solution separated in the generator 10 is fed through the heat exchanger 18 and then to the absorber 15, and the refrigerant gas separated in the generator 10 is fed through the precooling heat exchanger 30.

Meanwhile, the dilute solution from the absorber 15 is pumped through the precooling heat exchanger 30.

The dilute solution is then fed by the second pipe member 45 through the heat exchanger 18 and to the generator 10.

At this time, the low-temperatured dilute solution from the sixth pipe member 46 and the high-temperatured refrigerant gas from the third pipe member 43 are heat-exchanged in the precooling heat exchanger 30.

In other words, because the dilute solution and the refrigerant gas are heat-exchanged in the precooling heat exchanger 30, a portion of the refrigerant gas is changed into refrigerant solution therein.

Furthermore, the refrigerant solution condensed in the precooling heat exchanger 30 is led by the seventh pipe member 47 to the evaporator 14, and the refrigerant gas not condensed in the precooling heat exchanger 30 is fed by the eighth piping member 48 to the condenser 12.

Furthermore, the refrigerant gas fed to the condenser 12 is now condensed in the condenser 12 and changed into refrigerant solution, which in turn is guided by the ninth piping member 49 to the evaporator 14.

In other words, the refrigerant gas separated in the generator 10 is initially condensed in the precooling heat exchanger 30, a portion of which being changed into refrigerant solution for supply to the evaporator 14, while the other portion of the refrigerant gas not condensed in the precooling heat exchanger 30 is condensed in the condenser 12 to thereafter be supplied to the evaportor 14.

In accordance with this embodiment, the load on the condenser 12 is lightened to thereby reduce the capacity of the condenser 12 and to enable the system to be reduced to a compact size, and at the same time, to more efficiently condense the refrigerant gas.

Furthermore, because the refrigerant solution condensed in the condenser 12 is fed to the evaporator 14, and the refrigerant solution condensed in the precooling heat exchanger 30 is fed to the evaporator 14, a larger amount of refrigerant solution is supplied to the evaporator 14, and a much more improved cooling output can be generated by the evaporator 14.

The refrigerant solution supplied to the evaporator 14 is evaporated into refrigerant gas, which is, in turn, guided by the tenth pipe member 50 to the absorber 15.

The concentrated solution which has passed through the heat exchanger 18 is guided to the absorber 15.

In other words, in the absorber 15, the refrigerant gas received from the tenth pipe member 50 is absorbed into the refrigerant solution received from the fourth piping member 44 and thereby changed into the dilute solution.

Furthermore, the dilute solution from the absorber 15 is supplied to the generator 10 by the pumping means 51, to thereafter repeat the aforementioned cycle.

As apparent from the aforesaid description, the absorption cooling device according to the present invention causes refrigerant gas separated in the generator to be condensed into refrigerant solution in both the precooling heat exchanger 30 and the condenser so that the capacity of the condenser can be lightened and the system can be reduced to a compact size and at the same time, a condensing efficiency of the refrigerant gas can be improved markedly to obtain a remarkable cooling effect in the evaporator 14.

Although the preferred embodiment of the invention has been disclosed for illustrative purposes, those skilled in the art will appreciate that various modifications, additions and substitutions are possible, without departing from the scope and spirit of the invention as disclosed in the accompanying claims.

What is claimed is:

1. An absorption cooling system comprising:

an evaporator for causing liquid refrigerant to evaporate and become a gaseous refrigerant for producing a cooling effect;

an absorber for receiving gaseous refrigerant from said evaporator and mixing such gaseous refrigerant with concentrated liquid refrigerant to form a dilute refrigerant solution;

a generator for receiving the dilute refrigerant solution from said absorber and separating such dilute refrigerant solution into gaseous refrigerant and concentrated liquid refrigerant;

a precooling heat exchanger for producing a heat exchange relationship between:

dilute refrigerant traveling from said absorber to said generator, and gaseous refrigerant discharged from said generator, whereby some of said gaseous refrigerant is condensed and the rest of said gaseous refrigerant remains uncondensed;

a condenser connected to a gas outlet of said precooling heat exchanger for receiving said uncondensed refrigerant from said precooling heat exchanger; and a conduit connecting a liquid outlet of said precooling heat exchanger to said evaporator for conducting said condensed refrigerant to said evaporator.

2. The cooling device according to claim 1 further including an additional heat exchanger for exchanging heat between:

dilute refrigerant solution traveling from said precooling heat exchanger to said generator, and concentrated liquid refrigerant traveling from said generator to said absorber.

* * * * *